Nov. 16, 1971  R. W. SCHMIDT  3,620,091
POWER AMPLIFIER
Filed Oct. 22, 1969
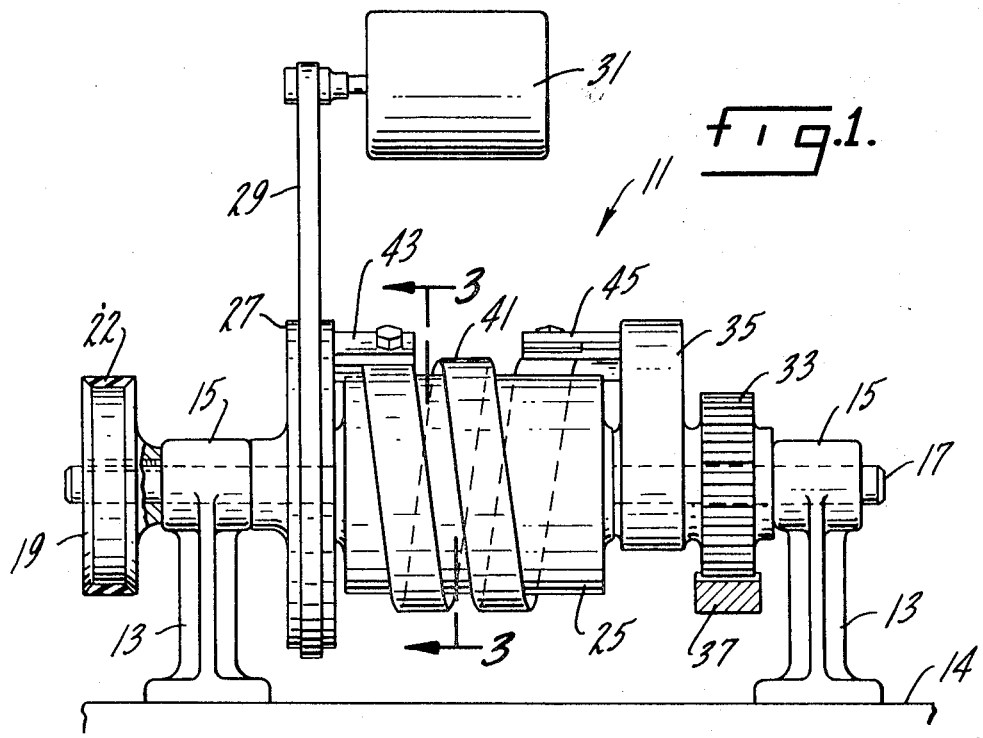
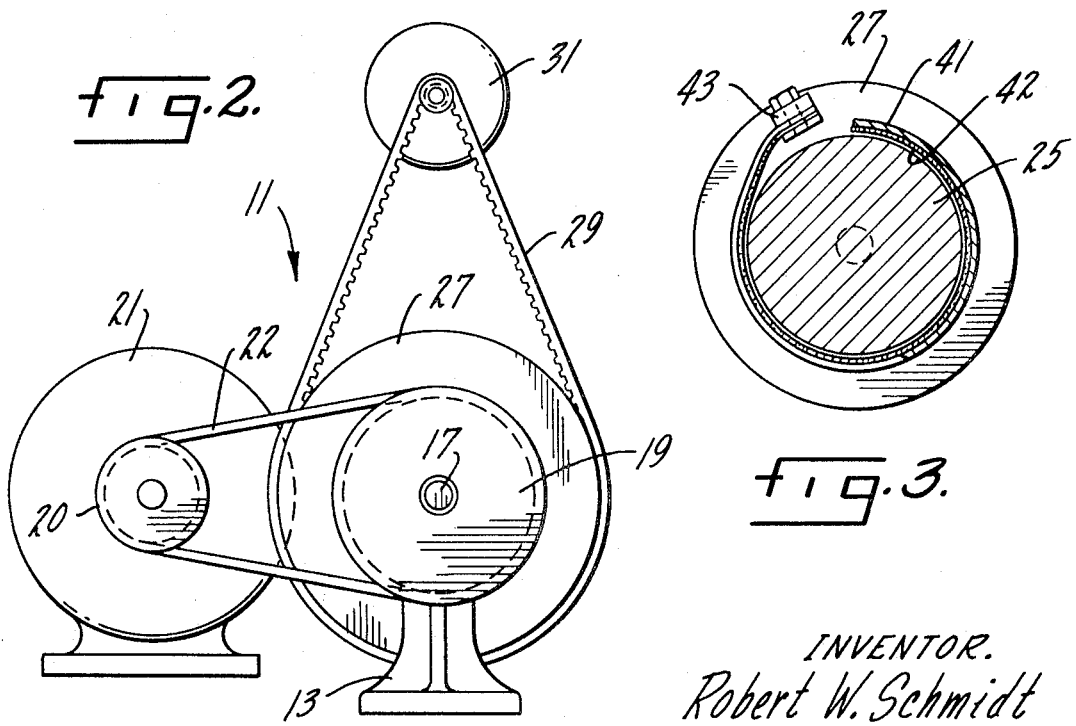
INVENTOR.
Robert W. Schmidt
BY Parker, Carter & Markey
Attorneys.

3,620,091
POWER AMPLIFIER
Robert W. Schmidt, 5744 W. 77th St.,
Oak Lawn, Ill. 60459
Filed Oct. 22, 1969, Ser. No. 868,383
Int. Cl. F16h 19/04
U.S. Cl. 74—34                                    4 Claims

ABSTRACT OF THE DISCLOSURE

A power amplifier including a cylindrical drum mounted on a shaft which is rotatably driven by a high torque motor. An output gear is rotatably mounted on this shaft adjacent one end of the cylindrical drum and meshes with an output rack. A sheave rotatably mounted on the shaft at the opposite end of said cylindrical drum is rotatably driven by a low torque motor. A friction band is helically wound around said cylindrical drum with one end connected to said sheave and the other end connected to a crank arm formed as part of the output gear. Rotation of the sheave will tighten the frictional band in engagement with the cylindrical drum so that the cylindrical drum may drive the output gear and rack.

SUMMARY OF THE INVENTION

This invention is concerned with a power amplifier and more particularly with such an amplifier in which an input movement of relatively low force is duplicated by an output movement of higher force.

An object of this invention is a power amplifier which will exactly duplicate the movement of a low force or torque input with a high force or torque output.

Another object is a power amplifier in which the output force is self adjustable.

Other objects will be found in the following specification, claims and drawings.

BRIEF DESCRIPTION OF THE DRAWINGS

The invention is illustrated more or less diagrammatically in the following drawings wherein:

FIG. 1 is a front elevational view of a power amplifier embodying the novel aspects of this invention;

FIG. 2 is a side elevational view of the power amplifier of FIG. 1, and

FIG. 3 is a cross-sectional view taken along line 3—3 of FIG. 1.

DESCRIPTION OF THE PREFERRED EMBODIMENT

The power amplifier 11 embodying the novel aspects of this invention includes stanchions 13 adapted to be mounted on a support such as a floor or other surface 14. Formed as part of each stanchion and located at the top thereof are shaft support sleeves 15. A shaft 17 is journaled in the sleeves 15 and extends between and beyond the stanchions.

A sheave 19 having a V-shaped groove is affixed to the shaft 17 outwardly of one of the stanchions 13 and a sheave 20 having a V-shaped groove is connected to a high torque constant speed electric motor 21. A V-shaped belt 22 rides in the grooves and connects the shaft and the motor.

A cylindrical drum 25 is affixed to the shaft 17 and is located between the stanchions 13. A sprocket 27 is rotatably mounted on the shaft 17 between the drum 25 and a stanchion 13. A toothed belt 29 connects the sprocket 27 to a low torque electric motor 31. In this embodiment of the invention a stepping motor is used as the low torque motor.

A gear 33 is rotatably mounted on the shaft 17 between the cylindrical drum 25 and the other stanchion 13. A crank arm 35 formed integrally with the gear 33 is also rotatably mounted on the shaft 17. The gear meshes with the teeth of an output rack 37.

A frictional band 41 which may be formed of steel or other metal has a frictional clutch material 42 bonded to one side of the band and is wound in a helix around the cylindrical drum 25. One end of the band is connected at 43 to the sprocket and the opposite end is connected at 45 to the gear crank arm 35.

The use, operation and function of this invention are as follows:

The cylindrical drum 25, its attached shaft 17 and the sheave 19 are driven by the constant speed high torque electric motor 21. The diameters of the sheaves 19 and 20 and that of the drum are proportioned so that the peripheral speed of the drum will exceed the desired linear speed of the output rack 37. With this arrangement, there will always be slippage between the friction band 41 and the face of the cylindrical drum 25. Even though the cylindrical drum 25 is rotating at its predetermined constant speed as driven by the motor 21, there will be no movement of the output rack 37 so long as the friction belt 41 is not tightly wound around the cylindrical drum.

The operation of the low torque electric motor 31 provides a controlled movement of low force or torque which the power amplifier will duplicate in movement but will increase in force or torque. Upon rotation of the low torque motor 31 through a desired amount, the sprocket 27 will move a preselected peripheral distance in a clockwise direction as viewed in FIG. 3. Rotation of the sprocket will move the band 41 into frictional contact with the drum 25 which is also rotating in a clockwise direction as viewed in FIG. 3. The torque of the cylindrical drum 25 will be transferred to the band 41 through the clutch surface 42 to rotate the band and the attached crank arm 35 and gear 33 in a clockwise direction as viewed from the right of FIG. 1. The clockwise rotation of the crank arm 35 and gear 33 will move the rack 37 to the left when viewed from the right of FIG. 1. The linear movement of the rack 37 will duplicate the input movement of the low torque control motor 31 but the rack will have a much greater force output.

The linear output of the rack 37 must duplicate the input of the low torque motor 31 exactly. In other words, this amplifier will not cycle. If the output rack moves a linear distance greater than the input of the motor 31, the band 41 will be loosened, thereby reducing the torque delivered from the drum 25 to the crank arm 35 and the gear 33. If the rack 37 meets resistance, the frictional band 41 will be tightened and additional torque will be transferred from the cylindrical drum 25. The amount of torque will be limited only, of course, by the maximum torque output of the motor 21. When the crank arm 35 and gear 33, in effect, catch up with the movement of the sprocket 27, the band 41 will be released from frictional contact with the cylindrical drum 25, ending rotation of the gear 33 and movement of the rack 37.

Whereas, the controlled movement mechanism shown and described in this application is an electric motor connected by a toothed belt 29 to a sprocket 27, it should be understood that other arrangements may be made between the input motor and the sprocket. For example, a gear train or a roller chain may be used. In other words, almost any mechanical arrangement is suitable as long as there is a fixed relationship between the movement of the input motor and linear movement of the member connected to one end of the friction band. It should also be understood that other suitable types of power transmissions may be used in lieu of the gear 33, rack 37 and crank arm 35. For example, a gear chain, a roller chain, or toothed belt may be used in place of these members. Therefore, the invention should not be limited to the exact embodiment shown and described herein.

I claim:

1. A torque amplifier including a movable input member and a movable output member, a rotating member moving at an angular velocity in excess of that at which the input member is driven, coupling means permanently connecting said input and output members and positioned for frictional contact with said rotating member, movement of said input member in the direction of rotation of the rotating member increasing the frictional contact between the coupling means and the rotating member such that the velocity of the input member is matched by the output member at an amplified torque supplied by the rotating member.

2. The structure of claim 1 further characterized in that said movable output member includes a rack and a gear.

3. The structure of claim 1 further characterized in that said rotating member is a rotatable cylinder attached to a shaft, said coupling means being a band positioned outside of said rotatable cylinder, one end of said band being connected to said input member and the other end being connected to said output member.

4. The structure of claim 3 further characterized in that said band is wrapped helically about said cylinder.

References Cited

UNITED STATES PATENTS

| | | | |
|---|---|---|---|
| 801,728 | 10/1905 | Linsay | 192—81 |
| 3,248,970 | 5/1966 | Pickles | 74—422 |

FOREIGN PATENTS

| | | | |
|---|---|---|---|
| 127,697 | 6/1919 | Great Britain | 192—81 |

OTHER REFERENCES

Fine et al.: Improved Spring Clutch, 3–1966, vol. 8, No. 8, page 1414, IBM Technical Disclosure.

WILLIAM F. O'DEA, Primary Examiner

W. S. RATLIFF, JR., Assistant Examiner

U.S. Cl. X.R.

192—81